No. 652,275. Patented June 26, 1900.
A. KRASTIN.
INTERCHANGEABLE GEAR DRIVING MECHANISM FOR MOTOR VEHICLES, &c.
(Application filed Sept. 18, 1899.)
(No Model.) 2 Sheets—Sheet 1.

WITNESSES
Frank Lieblang
C. W. D. Moory

INVENTOR
August Krastin
BY B. F. Eibler
Atty

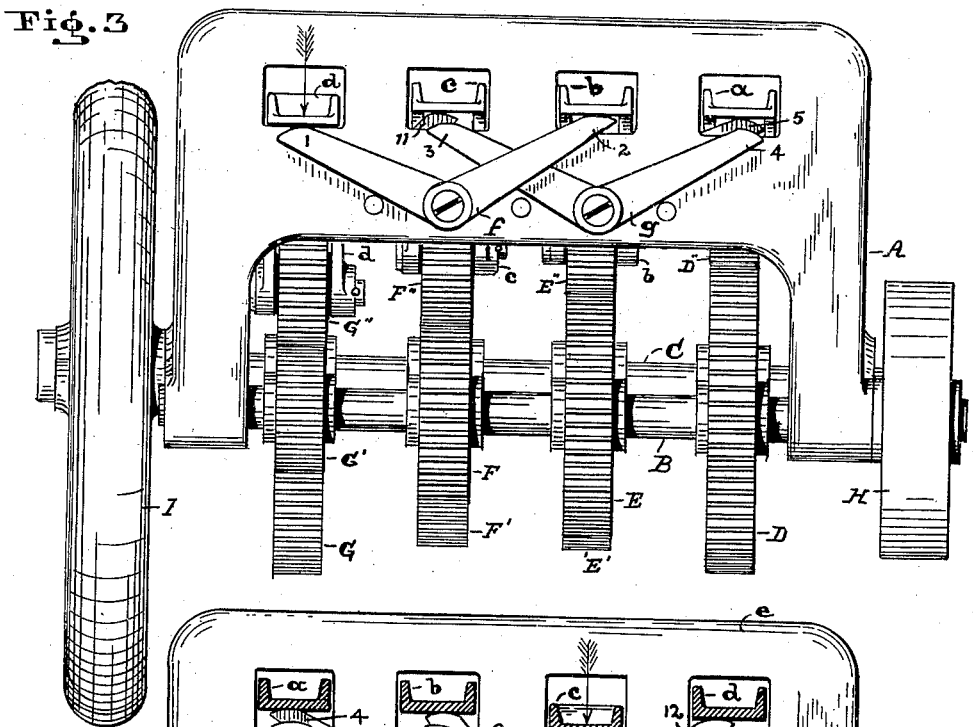
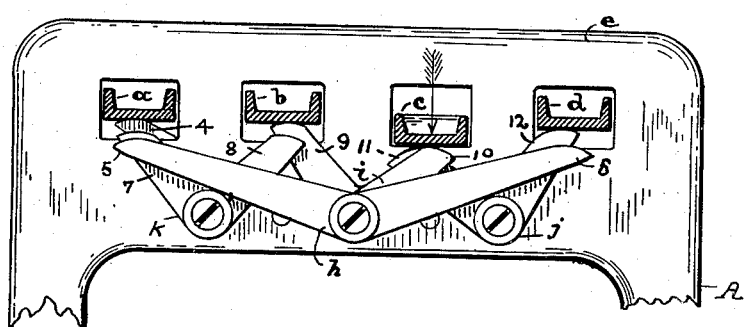

UNITED STATES PATENT OFFICE.

AUGUST KRASTIN, OF CLEVELAND, OHIO, ASSIGNOR OF ONE-THIRD TO J. GEORGE SCHNUERER, OF SAME PLACE.

INTERCHANGEABLE-GEAR DRIVING MECHANISM FOR MOTOR-VEHICLES, &c.

SPECIFICATION forming part of Letters Patent No. 652,275, dated June 26, 1900.

Application filed September 18, 1899. Serial No. 730,818. (No model.)

*To all whom it may concern:*

Be it known that I, AUGUST KRASTIN, a citizen of the United States of America, and a resident of Cleveland, county of Cuyahoga, and State of Ohio, have invented certain new and useful Improvements in Interchangeable-Gear Driving Mechanism for Motor-Vehicles, &c., of which the following is a specification.

My invention relates to means for transmitting motion; and the objects of my improvement are, first, to provide for a driving mechanism whereby motion can be transmitted at variable and positive speed, and, second, to equip such mechanism with suitable means whereby a change of speed can be effected readily, conveniently, and with the least exertion in manipulating such a change of speed. I attain these objects in a contrivance substantially as illustrated in the accompanying drawings, in which—

Figure 1:
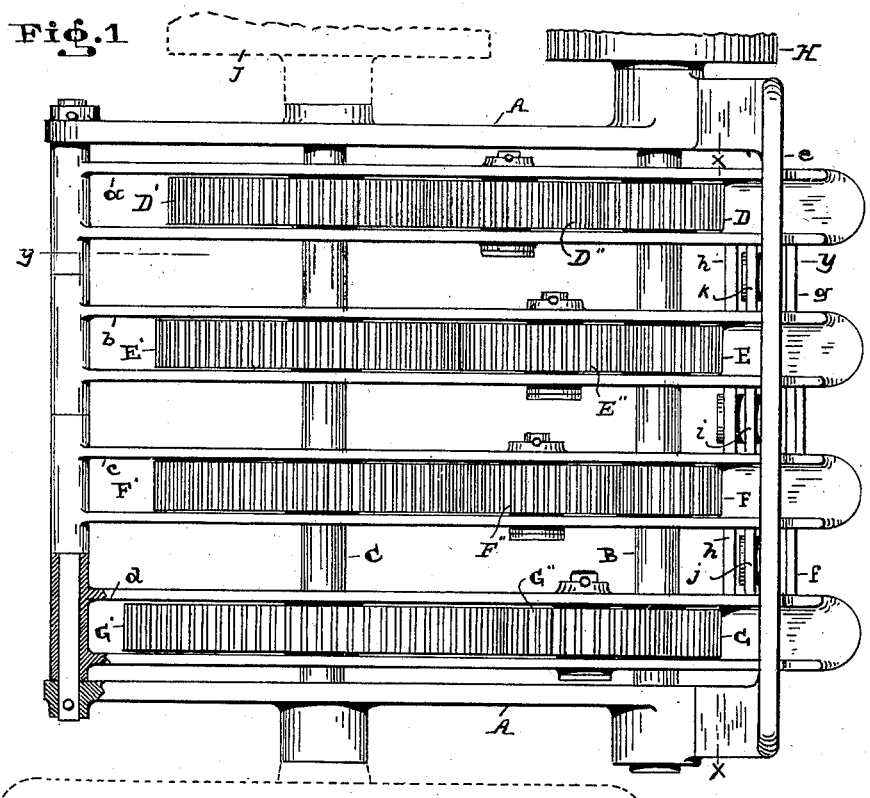
Figure 2:
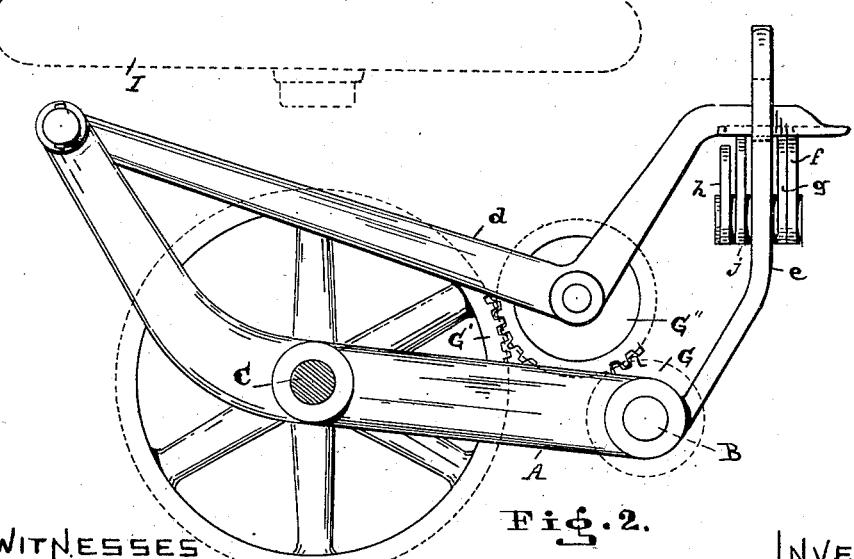

Figure 1 represents a plan view of said mechanism. Fig. 2 is a side view of same. Fig. 3 is a front elevation of same. Fig. 4 is a partial inner view on line $x\,x$, (see Fig. 1,) and Fig. 5 represents a vertical longitudinal sectional view on line $y\,y$. (See Fig. 1.)

Like letters and figures of reference denote like parts in the drawings and specification.

Substantially the contrivance comprises a frame A, which carries the driving-shaft B and the driven shaft C. Upon each of the shafts are securely mounted a series of gear-wheels, which are set in mesh by a series of idle wheels. The arrangement of the gears is such as to produce a variable speed of the driven shaft from fast speed to slow speed, or vice versa. In the drawings four sets of gears are shown, each pair (when in mesh) effecting a different speed of the driven shaft. As shown, the fastest speed of the driven shaft is attainable when the wheels D D' are set in gear by the idler D''. The wheels E E' with the idler E'' produce the next fastest speed. A slower speed of the driven shaft C is produced by the wheels F F' in conjunction with idler F'', and the slowest speed is had by the wheels G G'' and their idler G'''. (See drawings.) It is assumed that the driving-shaft B is running continuously in either direction and that one should be enabled to set any one of the idlers in gear with its respective wheels and that simultaneously all the others should be kept removed or be removed from the wheels. To accomplish this, I mount the idlers in hangers $a\,b\,c\,d$, which have pivotal connection at the rear of the frame and a movable support at or near the front part of said frame. As shown, each of the hangers extends through an aperture of the guide-plate $e$, and the supports therefor are furnished by a series of levers $f, g, h, i, j$, and $k$, which are pivoted on the outer and inner sides of said plate, substantially as shown in Figs. 2, 3, and 4. The arrangement of said levers is such as to admit at a time the lowering of only one of said hangers, while all the others must be held in raised condition or be raised. In Fig. 2 it is supposed that the hanger $d$ had been forced downward to cause an engagement of the idler G'' with its wheels G G'. At such event the hangers $c\,b\,a$ must be held in raised condition, which is accomplished for the hanger $c$ by the arm 11 of the lever $j$, for the hanger $b$ by the arm 2 of lever $f$, and for the hanger $a$ by the arm 5 of lever $h$. As above stated, the shaft C moves now at its slowest speed, since the smallest pinion drives the largest wheel. Should it be desirable to engage the next fastest speed, then the hanger $c$ must be forced downward to bring the idler F''' in gear with the wheels F F'. Simultaneously the idler G'' must be disengaged, which is caused by the arm 12 of lever $j$ in raising the hanger $d$. The hanger $b$ is now supported by arm 9 of lever $i$ and the hanger $a$ by arm 4 of lever $g$. Should the fastest speed come in action, then the hanger $a$ would have to be pushed downward in order to bring the idler D'' in mesh with the wheels D D'. The hanger $c$ would in that instance be forced upward by arm 3 of lever $g$, the hanger $b$ would be supported by the arm 8 of lever $k$, and the hanger $d$ would receive its support by arm 6 of lever $h$. From the foregoing it will be noticed that some of the levers remain passive at particular instances, yet any one of them will come into action at some instance.

It is obvious that various means may be employed for pushing or pressing the hangers downwardly in order to set one or the other of the idlers in gear with the wheels. Pneumatic pressure may be employed. Also levers or pins can be applied for causing an interchange in the position of the hangers.

A contrivance as shown for interchange of speed in the driven shaft is preëminently useful in connection with motor-vehicles owing to the ease with which the gears may be exchanged and the positive reliable manner in which such interchange is accomplished. In the drawings a gear-wheel H is shown, to which motion is imparted from a prime mover either directly or indirectly, as would be the case when this contrivance is used in connection with a motor-vehicle, for the reason that the gear H should turn in either direction. For motor-vehicles the hind driving-wheels (one of which is indicated at I) may either be directly attached to the shaft C or a chain connection may be used, driven from a wheel, as indicated at J. The wheel I is purported to indicate a rubber-tire wheel, and the wheel J a sprocket-wheel. Furthermore, the frame for support of the shafts and hangers may be modified in many respects to suit particular applications without departing from the nature of my invention. Also it is obvious that any number of wheels may be operated in the manner as above described and that such arrangement of levers is positive in action and admits of engagement of only one idler at a time and not until the previously-operating idler is about to be released.

What I claim, and desire to secure by Letters Patent, is—

1. The combination with a suitable frame a driving-shaft a driven shaft and a plurality of gear-wheels effecting differential speeds for the driven shaft, of idlers, hangers for said idlers and a series of two-armed pivoted levers arranged under the free ends of said hangers in such manner that the setting-in gear of either one of said idlers becomes contingent upon the inert condition of all the other idlers all constructed and arranged substantially as and for the purpose set forth.

2. An interchangeable driving mechanism for motor-vehicles and the like comprising a suitable frame, a driving-shaft, a driven shaft, a plurality of gears upon each of said shafts, said gears being arranged in sets of inverse proportions, an idle wheel for each set of said gears, hangers carrying said idle wheels and a series of bell-crank levers arranged juxtaposited under the free ends of said hangers to control the position of the latter substantially in the manner as and for the purpose set forth.

3. An interchangeable-gear driving mechanism comprising the combination of a suitable frame, a driving-shaft, a driven shaft, a plurality of gear-wheels assembled upon said shafts in sets presenting different speed ratios, an idle wheel for each set of wheels, hinged hangers for said idlers extending in alinement with said wheels, a plurality of bell-crank levers mounted under the free ends of said idler-hangers to effect directly and indirectly an automatic disengagement of the idlers under and with the condition as set forth.

4. A releasing mechanism for the idle wheels of a plurality of sets of gear-wheels effecting different speeds comprising pivoted hangers for said idlers and a series of two-armed pivoted levers which engage under the free ends of said hangers and lift said hangers by and through the incentive of that hanger, which carries the idler to be engaged all constructed and arranged substantially in the manner as and for the purpose set forth.

Signed by me at Cleveland, Ohio, this 2d day of September, 1899.

AUGUST KRASTIN.

Witnesses:
BERNH. F. EIBLER,
J. GEO. SCHNUERER.